United States Patent [19]

Ono

[11] Patent Number: 5,473,457

[45] Date of Patent: Dec. 5, 1995

[54] METHOD AND APPARATUS FOR COMPENSATING DISPERSION OF POLARIZATION

[75] Inventor: Takashi Ono, Tokyo, Japan

[73] Assignee: NEC Corporation, Japan

[21] Appl. No.: 357,866

[22] Filed: Dec. 16, 1994

[30] Foreign Application Priority Data

Dec. 20, 1993 [JP] Japan .................................. 5-320643

[51] Int. Cl.⁶ .............................. H04B 10/00; G02B 6/28
[52] U.S. Cl. ......................... 359/161; 359/156; 359/122; 359/182; 359/189; 385/11; 385/24
[58] Field of Search .................................. 359/156, 160, 359/161, 115, 122, 189, 192, 195, 152, 153, 182, 183; 356/345; 385/1, 11, 14, 24

[56] References Cited

U.S. PATENT DOCUMENTS

| | | | |
|---|---|---|---|
| 5,031,998 | 7/1991 | Ono et al. | 385/1 |
| 5,111,322 | 5/1992 | Bergano et al. | 359/122 |
| 5,127,066 | 6/1992 | Poggiolini | 385/24 |
| 5,173,743 | 12/1992 | Kim | 356/345 |
| 5,295,013 | 3/1994 | Ono | 359/192 |
| 5,386,314 | 1/1995 | Jopson | 359/326 |

FOREIGN PATENT DOCUMENTS 6-284093  10/1994  Japan .

OTHER PUBLICATIONS

M. G. Taylor, "Observation of New Polarisation Dependence Effect in Long Haul Optically Amplified System", OFC/IOOC '93 PD5, pp. 25–27 no month.

L. J. Cimini, et al., "Polarisation–Insensitive Coherent Lightwave System Using Wide–Deviation FSK and Data–Induced Polarisation Switching", Electronics Letters, vol. 24, No. 6, Mar. 17, 1988, pp. 358–360.

H. Shimizu, et al., "Highly Practical Fiber Squeezer Polarization Controller", J. of Lightwave Technology, vol. 9, No. 10, Oct. 1991, pp. 1217–1224.

Takashi Ono, et al., "Suppression of Polarization Mode Dispersion Influence in Long Span Optical Repeater Transmission Systems", OAA '93, pp. 42–45 no month.

Primary Examiner—Akm E. Ullah
Assistant Examiner—Hemang Sanghavi
Attorney, Agent, or Firm—Ostrolenk, Faber, Gerb & Soffen

[57] ABSTRACT

A signal light which is frequency-modulated by a predetermined frequency is supplied to an optical fiber. The signal light supplied from an output end of the optical fiber is supplied to a polarization controller, from which the signal light is supplied to a polarization maintaining optical fiber. An output signal light of the polarization maintaining optical fiber is supplied to a polarization separating device, in which two orthogonal polarizations are obtained. Signal lights of the two orthogonal polarizations are received by a balanced photodetector, in which an electric signal is generated. In the electric signal, an intensity of the predetermined frequency component is detected. Then, the polarization controller is controlled to constantly minimize the intensity, so that the polarization dispersion in a transmission line is compensated to suppress the deterioration of wave-shape.

4 Claims, 3 Drawing Sheets

WAVE-SHAPE OF RECEIVED SIGNAL

WAVE-SHAPE OF RECEIVED SIGNAL

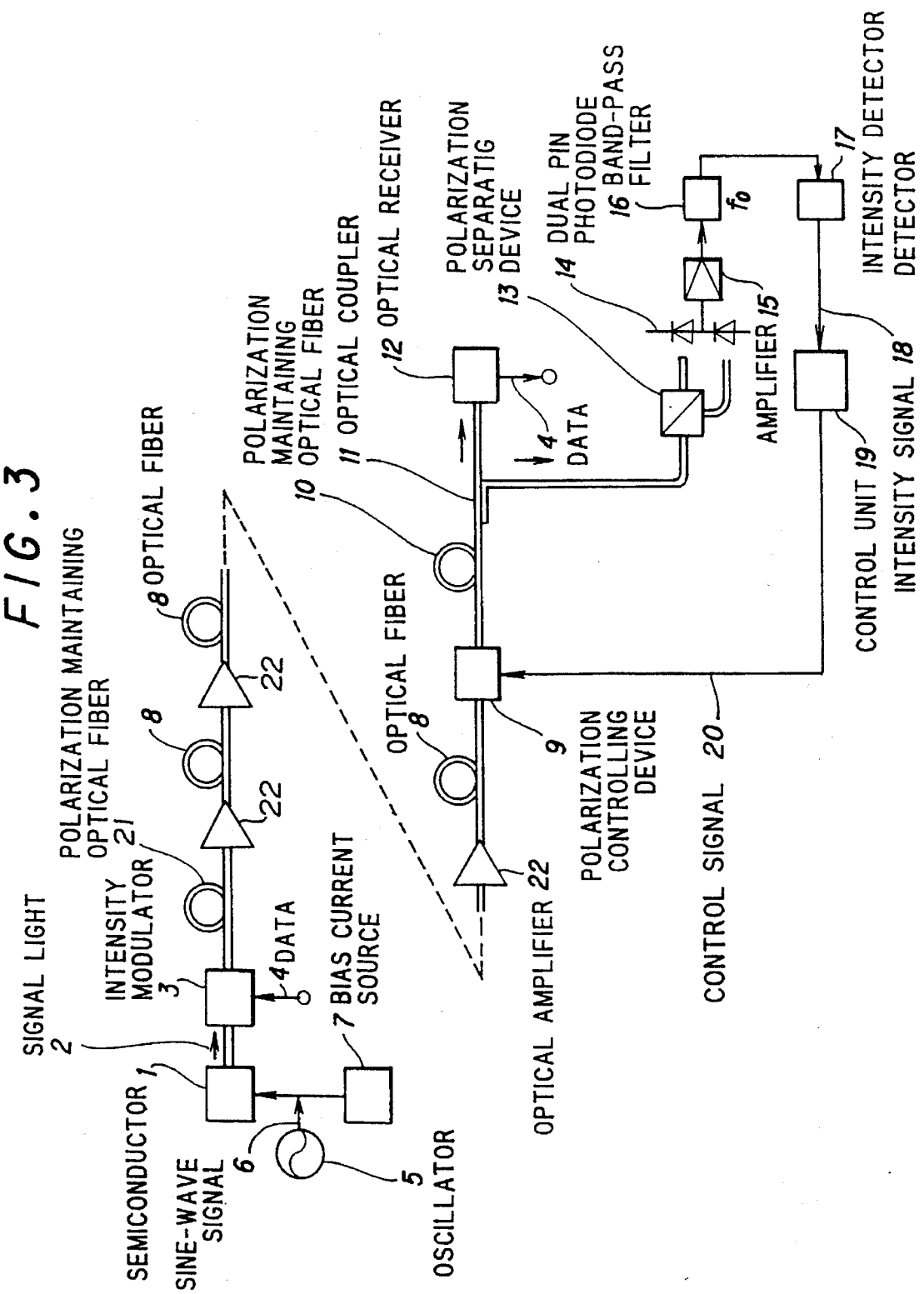

METHOD AND APPARATUS FOR COMPENSATING DISPERSION OF POLARIZATION

FIELD OF THE INVENTION

The invention relates to a method and an apparatus for compensating the dispersion of polarization, and more particularly to, a method and an apparatus to suppress the degradation of wave-shape caused by the dispersion of polarization in an optical communication system.

BACKGROUND OF THE INVENTION

A considerable amount of polarization dispersion is accumulated for a signal light which is transmitted through an optical fiber, optical parts such as an optical isolator, etc. over a long distance in an optical communication system. The polarization dispersion occurs due to propagation delay time difference between two principal polarization modes (two intrinsic axes) orthogonal to each other in an optical fiber. When the polarization dispersion occurs, wave-shapes of received signals are deteriorated to lower receiving sensitivity.

As proposed in the Japanese Patent Kokai No. 5-71399 by the inventor, first and second polarization controlling devices are provided, wherein a signal light frequency-modulated by a frequency of $f_0$ is supplied to the first polarization controlling devices to be transmitted through an optical fiber provided between the first and second polarization controlling device, and the transmitted signal light is supplied to the second polarization controlling device, from which the signal light is supplied to a polarization separating device, in which two orthogonal polarizations are obtained. One of the two orthogonal polarizations is converted to an electric signal, from which a frequency component of $f_0$ is detected. Then, the first polarization controlling device is controlled, so that the frequency component is minimum in amplitude, and the second polarization controlling device is controlled, so that the frequency component is maximum in amplitude. Thus, a polarization state of the signal light is coincident to an intrinsic axis to suppress the polarization dispersion. Consequently, the deterioration of the received signal is avoided.

Further, it is not negligible in an optical repeating system, in which signal lights are amplified to be transmitted through a long distance of optical fibers, that power losses are caused by polarization dependency of optical parts, and gains of optical amplifiers are influenced by polarization dependency thereof (also defined "polarization haul-burning"). In order to suppress the influence of the polarization dependency, it is proposed in "Observation of new polarization dependence effect in long haul optically amplified system" on pages 25 to 27 of OFC/IOOC'93 (San Jose, U.S.A.), PD5 by M. G. Taylor that modulating polarization of a signal light is effective. For this purpose, it is proposed in "Polarization-insensitive coherent lightwave system using wide-deviation FSK and data-induced polarization switching" on pages 358 to 360 of the Electronics Letters, 17th March 1988, Vol. 24, No. 6 by L. J. Cimini et al that a signal light is frequency-modulated to be transmitted through a polarization maintaining optical fiber to provide polarization modulation which is dependent on a light frequency. In the proposed system, no specific optical device such as an optical phase modulator is advantageously required to realize the polarization modulation.

In the conventional apparatus as proposed in the Japanese Patent Application No. 5-71399, however, there is a disadvantage in that the frequency-modulation unit and the polarization controlling devices are provided at different locations to cause a control signal delayed. This results in the limitation on control response speed.

In the conventional apparatus using the polarization maintaining optical fiber as proposed in the Electronics Letters, there is a disadvantage in that the deterioration of wave-shape is caused by the polarization dispersion of the polarization maintaining optical fiber, when the rate of data is fast to be more than 10 Gb/s.

SUMMARY OF THE INVENTION

Accordingly, it is an object of the invention to provide a method and an apparatus for compensating the dispersion of polarization in which the compensation of the polarization dispersion is carried out only on a receiving side to remove the limitation on the control response speed caused by the transmission delay of control signals.

It is a further object of the invention to provide a method and an apparatus for compensating the dispersion of polarization in which the polarization dispersion is compensated without dependency on a location where it occurs.

According to the first feature of the invention, a method for compensating the dispersion of polarization, comprising the steps of comprising:

supplying a signal light to an optical fiber, the signal light being frequency-modulated by a predetermined frequency;

supplying the signal light to a polarization controller at an output end of the optical fiber;

supplying the signal light supplied from the polarization controller to a polarization maintaining optical fiber having a polarization dispersion approximately equal to an amount of polarization dispersion to be compensated;

separating two orthogonal polarizations of the signal light supplied from the polarization maintaining optical fiber by a polarization separating device, the polarization separating device being arranged relative to intrinsic axes of the polarization maintaining optical fiber by 45°;

converting a signal light of one of the two orthogonal polarizations to an electric signal;

detecting a component of the predetermined frequency of the electric signal; and controlling the polarization controller to minimize the component.

According to the second feature of the invention, an apparatus for compensating the dispersion of polarization, comprises:

a signal light emitting unit for emitting a signal light, the signal light being frequency-modulated by a predetermined frequency, and intensity-modulated by data;

an optical fiber for transmitting the signal light to a signal light receiving side;

a polarization controller for controlling a polarization of the signal light at an output end of the optical fiber on the signal light receiving side;

a polarization maintaining optical fiber for transmitting the signal light of the polarization controlled by the polarization controller, the polarization maintaining optical fiber having a polarization dispersion equal approximately to an amount of polarization dispersion to be compensated for the signal light supplied from the polarization controller;

an optoelectric converter for converting the signal light supplied from the polarization maintaining optical fiber to an electric signal;

a component detector for detecting an intensity of a component of the predetermined frequency in the electric signal; and a control unit for controlling the polarization controller to minimize the intensity of the component by receiving said intensity of the component.

BRIEF DESCRIPTION OF THE DRAWINGS

The invention will be explained in more detail in conjunction with appended drawings, wherein:

FIG. 3 is a block diagram showing an apparatus for compensating the dispersion of polarization in a second preferred embodiment according to the invention.

DESCRIPTION OF THE PREFERRED EMBODIMENTS

Figure 1:
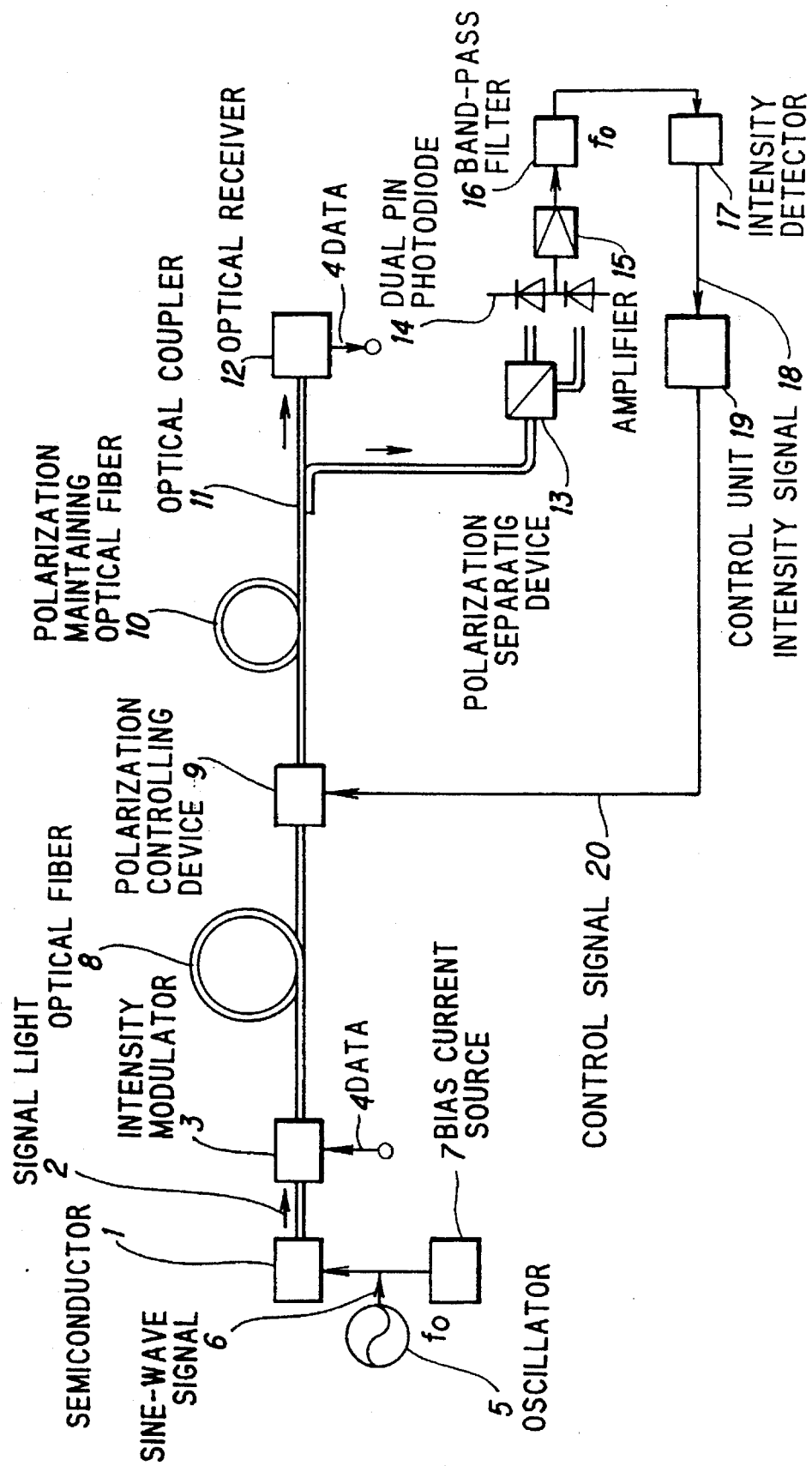
FIG. 1 is a block diagram showing an apparatus for compensating the dispersion of polarization in a first preferred embodiment according to the invention.

FIG. 1 shows an apparatus for compensating the dispersion of polarization in the first preferred embodiment according to the invention, wherein it comprises a semiconductor laser 1 for emitting a signal light 2, a bias current source 7 for supplying a bias current which is modulated by a sine-wave signal 6 of a frequency $f_0$ generated in an oscillator 5 to the semiconductor laser 1, and intensity modulator 3 for modulating the signal light 2 by data 4, a polarization controller 9 receiving the data-modulated signal light 2 via an optical fiber 8, a polarization maintaining optical fiber 10 for transmitting a polarization-controlled signal light, an optical coupler 11 for branching the polarization controlled signal, an optical receiver 12 for detecting the data 4 from the received signal light, a polarization separating device 13 for separating signal lights of two polarizations orthogonal to each other, dual PIN photodiodes 14 for converting the two signal lights to electric signals, an amplifier 15 for amplifying an output signal of the photodiodes 14, a band-pass filter 16 for providing a signal component of the frequency $f_0$, an intensity detector 17 for detecting the signal component, a control unit 19 for controlling the polarization controller 9 by supplying a control signal 20 thereto.

In operation, the bias current of 100 mA is supplied from the bias current source 7 to the semiconductor laser 1 which lases with a wavelength of 1.55 μm. The bias current is superposed with a sine-wave signal 6 of 100 kHz, so that the signal light 2 emitted from the semiconductor laser 1 is frequency-modulated to have a light frequency deviation of 10 GHz in accordance with the adjustment of an amplitude of the sine-wave signal 6 generate in the oscillator 5. The frequency-modulated signal light 2 is supplied to the intensity modulator 2, in which it is modulated by the data 4 of 10 Gb/s, and the data-modulated signal light is transmitted through the optical fiber 8 which is a zero-dispersion optical fiber 8 having a polarization dispersion or a transmission delay time difference of 50 ps due to the deviation of a core from a real circle caused by the precision in fabrication. The output signal light of the optical fiber 8 is supplied via the polarization controller 9 to the polarization maintaining optical fiber 10.

The polarization controller 9 is a fiber squeezer polarization controller in which a polarization state is changed by applying a side pressure to an optical fiber, and consists of five squeezers, wherein an input signal light of an arbitrary polarization is changed to be an output signal light of an arbitrary polarization, and unlimited tail-tracing operation of polarization can be carried out, as described in "Highly Practical Fiber Squeezer Polarization" on pages 1217 to 1224 of Journal of Lightwave Technology, Vol. 9, No. 10, October 1991. The polarization maintaining optical fiber 10 has a length of 33.3 m to equalize a transmission delay time difference between the intrinsic axes to the polarization dispersion of 50 ps for the optical fiber 8.

At the output end of the polarization maintaining optical fiber 10, the signal light 2 is branched into two signal lights by the optical coupler 11. One of the two signal lights is received by the optical receiver 12, and the remaining one of the two signal lights is supplied to the polarization separating device 13, an optical axis of which is slant relative to the intrinsic axes of the polarization maintaining optical fiber 10 by 45 degrees. In the polarization separating device 13, the two orthogonal polarizations are obtained to be supplied to two light receiving portions of a balance type photodetector composed of the dual PIN photodiodes 14 and the amplifier 15. The output signal of the amplifier 15 is supplied to the band-pass filter 16 for transmitting an electric signal of 100 KHz, so that the demodulated sine-wave signal 6 is smapled to be supplied to the intensity detector 17, in which an intensity of the sine-wave signal 6 is detected. The detected intensity is monitored by the control unit 19 including a micro-processor, from which a control signal 20 is supplied to the polarization controller 9, so that the intensity of the sine-wave signal 6 is controlled to be constantly minimum. In this minimum intensity control in which a polarization state is slightly swung to be added with perturbation, the minimum value is sought by the so-called mountain climbing method.

As shown in FIG. 1, the control unit 19 and the polarization controller 9 can be provided at the same location. Therefore, a transmission delay time of the control signal 20 is negligible. For this structure, a response speed of the control unit 19 is set to be 0.1 ms which is the maximum response speed of the polarization controller 9. This response speed is normally much faster than a polarization fluctuating speed of approximately 10 ms at a frequency of 100 Hz which is caused by temperature change or vibration of the transmission line.

In accordance with the polarization control, a signal wave-shape of 10 Gb/s which has been deteriorated due to the polarization dispersion is largely improved to provide no deterioration of sensitivity. On the other hand, when no polarization control is applied to a signal light, the deterioration of sensitivity is measured to be 10 dB due to the polarization dispersion relative to a sensitivity prior to the transmission through the optical fibers.

Next, the principle of the invention will be explained in FIGS. 2A and 2B.

In the invention, a signal light is transmitted through a polarization maintaining optical fiber having a transmission delay time difference approximately equal to a polarization dispersion amount of a transmission line, so that a transmission delay time difference between two intrinsic axes is canceled to avoid the deterioration of a received signal wave-shape. As a result, it is characterized that no surplus penalty occurs in an optical communication system. It is assumed for an optical fiber 8 in the transmission line that an intrinsic axis of a faster transmission speed is $f_1$, and the remaining intrinsic axis of a lower transmission speed is $s_1$, and it is assumed for a polarization maintaining optical fiber 10 in the transmission line that an intrinsic axis of a faster transmission speed is $f_2$, and the remaining intrinsic axis of a lower transmission speed is $s_2$, respectively, as shown in FIGS. 2A and 2B. In order to cancel the transmission time difference, it is required that the axis $f_1$ and $s_2$ are coincident to each other, and the axes $s_1$ and $f_2$ are coincident to each other. In order to stably compensate the polarization dispersion even in case where the directions of the intrinsic axes are fluctuated due to the change of temperature, etc., a polarization controller is provided between the optical fiber 8 and the polarization maintaining optical fiber 10. In order to generate a control signal supplied to the polarization controller, a transmitting signal light is frequency-modulated to be transmitted through the optical fiber 8, and the signal light is separated in polarization to be received at a receiving end, in which a frequency modulated component is demodulated.

In more detail, the frequency modulated signal light, frequency of which ranges v1 to v2, is supplied to an input end of the optical fiber 8. When an input polarization state is not coincident to any one of the axes $f_1$ and $s_1$, an output polarization state is changed dependent on the light frequency, because a phase difference between two signal light components in the two intrinsic axis directions orthogonal to each other is changed dependent on the light frequency due to the existence of the transmission delay time difference between the two intrinsic axes. The output signal light thus obtained is supplied to the polarization maintaining optical fiber 10.

Figure 2A:
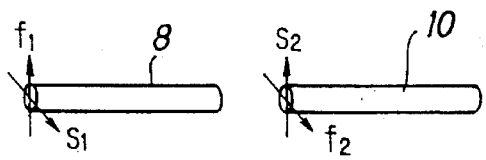
FIGS. 2A and 2B are explanatory diagrams explaining the principle of the invention.
Figure 2A:
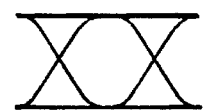
Figure 2A:
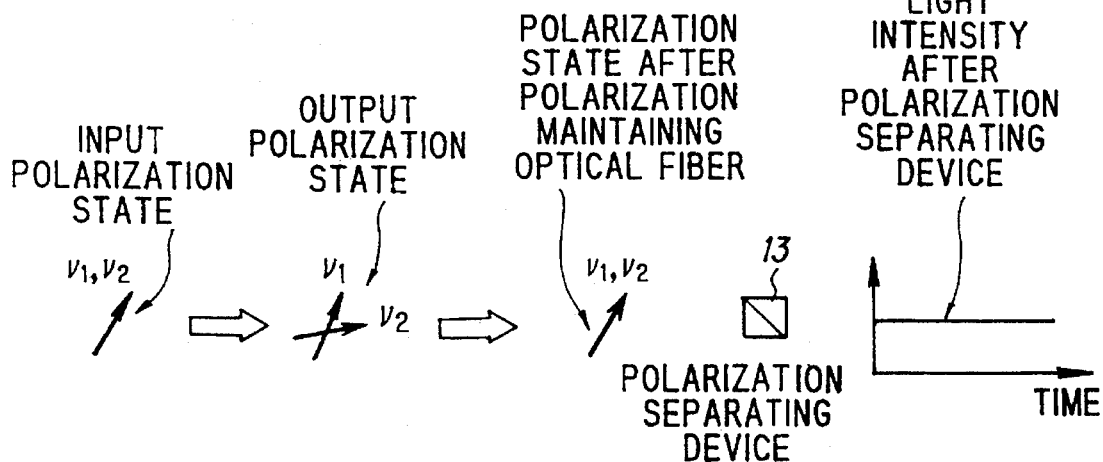

When the axes $f_1$ and $s_2$ are coincident to each other, as shown in FIG. 2A, an output signal light of the polarization maintaining optical fiber 10 is constant in polarization without any dependency of the light frequency. When the output signal light is supplied to a polarization separating device, an intensity of a transmitted light is constant to provide no demodulation of the frequency modulated component. In this situation, no deterioration of a received signal light occurs in wave-shape.

Figure 2B:
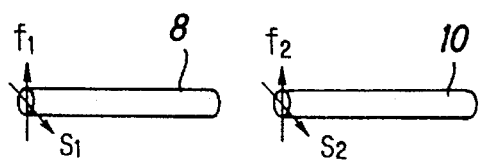
Figure 2B:
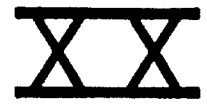
Figure 2B:
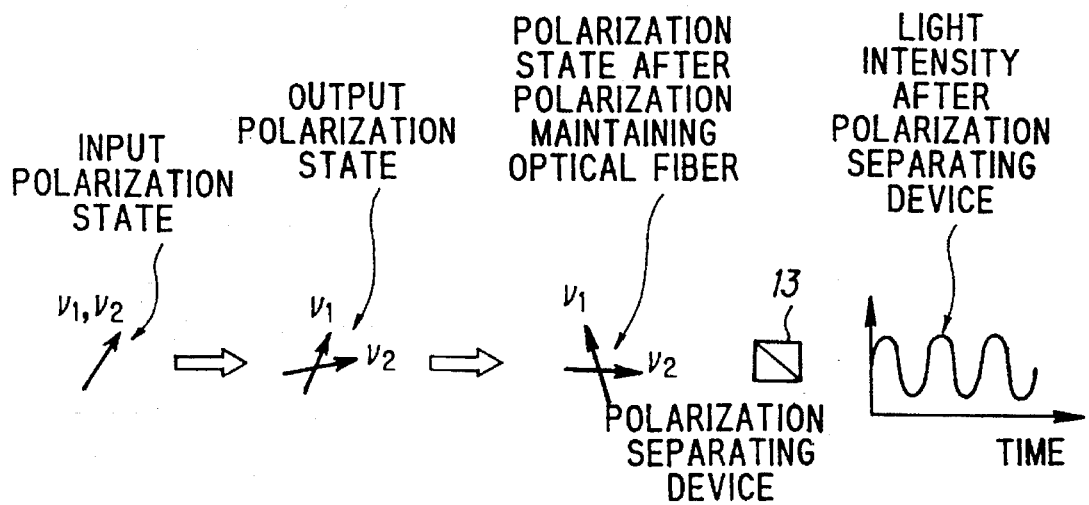

On the other hand, when the axes $f_1$ and $s_2$ are not coincident to each other, as shown in FIG. 2B, the polarization state of the output signal light of the polarization maintaining optical fiber 10 is changed dependent on the light frequency. When the output signal light is supplied to the polarization separating device, an intensity of a transmitted signal light is changed dependent on the light frequency. As a result, the frequency modulated component can be demodulated. In this situation, the received signal light is influenced in wave-shape due to the polarization dispersion, and the wave-shape is deteriorated.

In short, the polarization controller positioned at the input end of the polarization maintaining optical fiber is controlled to constantly provide th minimum intensity of the frequency modulated component, so that the axes $f_1$ and $s_2$ can be coincident to each other, and the axes $s_1$ and $f_2$ can be coincident to each other.

Further, even in case where an input polarization state of a signal light is accidently coincident to any one of the axes $f_1$ and $s_1$ of the optical fiber 8, a polarization state of an output signal light of the optical fiber 8 is controlled to be coincident to any one of the axes $f_2$ and $s_2$ of the polarization maintaining optical fiber 10 at the input end thereof by the polarization controller. Therefore, the deterioration of wave-shape caused by the polarization dispersion is constantly suppressed to provide stable transmission of signal lights.

FIG. 3 shows an apparatus for compensating the dispersion of polarization in the second preferred embodiment, wherein like part are indicated by like reference numerals as used in FIG. 1.

In this compensating apparatus, optical amplifiers 22 are provided between each two optical fibers 8 to constitute an optical repeating transmission system, and a polarization maintaining optical fiber 21 is provided in a transmitter to suppress polarization-dependent losses and influence of haul-burning.

In operation, a signal light 2 which is frequency-modulated by a sine-wave signal 6 of 100 KHz and intensity-modulated by data 4 of 10 Gb/s is supplied to the polarization maintaining optical fiber 21. An input polarization state of the signal light 2 is adjusted to be 45° relative to the intrinsic axes of the polarization maintaining optical fiber 21, and an output polarization state of the polarization maintaining optical fiber 21 is changed between the two orthogonal polarizations in accordance with an arrangement in which a deviation amount of the light frequency is 5 GHz, and a length of the polarization maintaining optical fiber 21 is 86.8 m to provide a transmission delay time difference of 100 ps. A polarization-modulated signal light thus obtained is supplied to a transmission line comprising the optical amplifiers 22 each being an Er-doped fiber amplifier and the optical fiber 8 each being a 1.55 µm zero-dispersion optical fiber and having a length of 50 km, thereby providing optical amplifying repeaters of 19 stages to carry out a signal light transmission of a total length 1000 km.

In this transmission line, the polarization dispersion is approximately 150 ps in accordance with the accumulation of polarization dispersions in the polarization maintaining optical fiber 21, the optical fiber 8 and the optical amplifiers 22. This amount of the polarization dispersion is considered to have substantially occurred in the polarization maintaining optical fiber 21, although it is slightly changed due to the fluctuation of the intrinsic axes of the optical fibers 8 dependent on the change of temperature.

On the receiving side, the same operation as in the first preferred embodiment is carried out. That is, the signal light 2 is transmitted through the polarization maintaining optical fiber 10 having a length of 100 m to provide a transmission delay time difference of 150 ps. An output signal light 2 of the polarization maintaining optical fiber 10 is branched into two signal lights, one of which is supplied to the optical receiver 12, and the remaining one of which is supplied to an frequency demodulated portion, in which the control unit 19 supplies a control signal 20 to the polarization controller 9, so that a frequency-modulated component thus demodulated becomes minimum in intensity, as explained in the first preferred embodiment.

When no control is applied to the polarization controller 9, there is a case in which receiving a signal light is impossible to be carried out dependent on the state of polarization. In the invention, however, the polarization dispersion is compensated to suppress the deterioration of sensitivity in signal light transmission. As described in the first preferred embodiment, a transmission delay time of the control signal 20 is negligible to appropriately follow polarization fluctuation caused by disturbance such as the change of temperature and vibration in a transmission line. Therefore, stable operation is continued for a long time.

In the first and second preferred embodiment, the fiber squeezer polarization controller may be replaced by a waveguide polarization controller fabricated from lithium niobate, a wavelength plate rotative polarization controller, a polarization controller using liquid crystal, etc. An intensity modulation-direct detection (IM-DD) system is used for a data demodulation system. This may be replaced by a frequency shift keying (FSK) system, a subcarrier system, etc. In the FSK system, the sine-wave signal 6 is not necessary to be used, but the data 4 can be used for this purpose. Further, an optical heterodyne.homodyne receiving is also applicable to the receiver.

Although the invention has been described with respect to specific embodiments for complete and clear disclosure, the appended claims are not to be thus limited but are to be construed as embodying all modification and alternative constructions that may occur to one skilled in the art which fairly fall within the basic teaching herein set forth.

What is claimed is:

1. A method for compensating polarization dispersion, comprising the steps of:

supplying a signal light to an optical fiber, said signal light being frequency-modulated by a predetermined frequency;

supplying said signal light to a polarization controller at an output end of said optical fiber;

supplying said signal light supplied from said polarization controller to a polarization maintaining optical fiber having a polarization dispersion approximately equal to an amount of polarization dispersion to be compensated;

separating two orthogonal polarizations of said signal light supplied from said polarization maintaining optical fiber by a polarization separating device, said polarization separating device being arranged relative to intrinsic axes of said polarization maintaining optical fiber by 45°;

converting a signal light of one of said two orthogonal polarizations to an electric signal;

detecting a component of said predetermined frequency of said electric signal; and controlling said polarization controller to minimize said component.

2. An apparatus for compensating polarization dispersion, comprises:

a signal light emitting unit for emitting a signal light, said signal light being frequency-modulated by a predetermined frequency, and intensity-modulated by data;

an optical fiber for transmitting said signal light to a signal light receiving side;

a polarization controller for controlling a polarization of said signal light at an output end of said optical fiber on said signal light receiving side;

a polarization maintaining optical fiber for transmitting said signal light of said polarization controlled by said polarization controller, said polarization maintaining optical fiber having a polarization dispersion equal approximately to an amount of polarization dispersion to be compensated for said signal light supplied from said polarization controller;

an optoelectric converter for converting said signal light supplied from said polarization maintaining optical fiber to an electric signal;

a component detector for detecting an intensity of a component of said predetermined frequency in said electric signal; and a control unit for controlling said polarization controller to minimize said intensity of said component by receiving said intensity of said component.

3. The apparatus as defined in claim 2, wherein:

said signal light emitting unit comprises a semiconductor laser emitting said signal light; a bias current source for injecting a bias current into said semiconductor laser; and an oscillator for generating a sine-wave signal of said predetermined frequency superposed with said bias current; and said optoelectric converter comprises a polarization separating device for separating two orthogonal polarizations of said signal; said polarization separating device being arranged relative to intrinsic axes of said polarization maintaining optical fiber by 45°; a dual PIN photodiode for generating said electric signal by receiving signal lights of said two orthogonal polarizations; a band-pass filter for passing said component in said electric signal; and an intensity detector for detecting said intensity of said component.

4. The apparatus as defined in claim 2, wherein:

said optical fiber comprises a predetermined number of optical amplifiers provided by a predetermined interval.

* * * * *